United States Patent [19]

Verboom

[11] Patent Number: 4,646,281
[45] Date of Patent: Feb. 24, 1987

[54] READ CHANNEL FOR AN OPTICAL RECORDER

[75] Inventor: Johannes J. Verboom, Colorado Springs, Colo.

[73] Assignee: Laser Magnetic Storage International Company, Colorado Springs, Colo.

[21] Appl. No.: 714,584

[22] Filed: Mar. 21, 1985

Related U.S. Application Data

[63] Continuation-in-part of Ser. No. 578,151, Feb. 8, 1984, abandoned.

[51] Int. Cl.$^4$ ............................................. G11B 20/10
[52] U.S. Cl. ..................................... 369/59; 369/124; 360/32
[58] Field of Search .................... 369/59, 124; 360/32, 360/40; 340/347 DD

[56] References Cited

U.S. PATENT DOCUMENTS 4,464,714 8/1984 Huyser ................................. 360/40

Primary Examiner—Alan Faber
Attorney, Agent, or Firm—J. A. Genovese; R. M. Angus

[57] ABSTRACT

A read channel for an optical recorder. Data is recorded on the media in a fixed block code. The data is read and the location of the holes within a symbol are determined for the odd and even symbol positions separately. The location of the hole is determined for an odd or an even hole by using two sample and hold cells to hold the signal value received at a symbol position and compare it to the signal value received at a previous position. If the comparison results in a new higher valued signal being found, the output of the comparator changes. If the output of the comparator changes, the address of the change is recorded. The last such change denotes the location of the symbol position having the highest signal value, which is the address of the hole. The address of the holes, even and odd, are used to directly convert from the fixed block code to binary. Two symbols convert to 8 binary bits.

23 Claims, 9 Drawing Figures

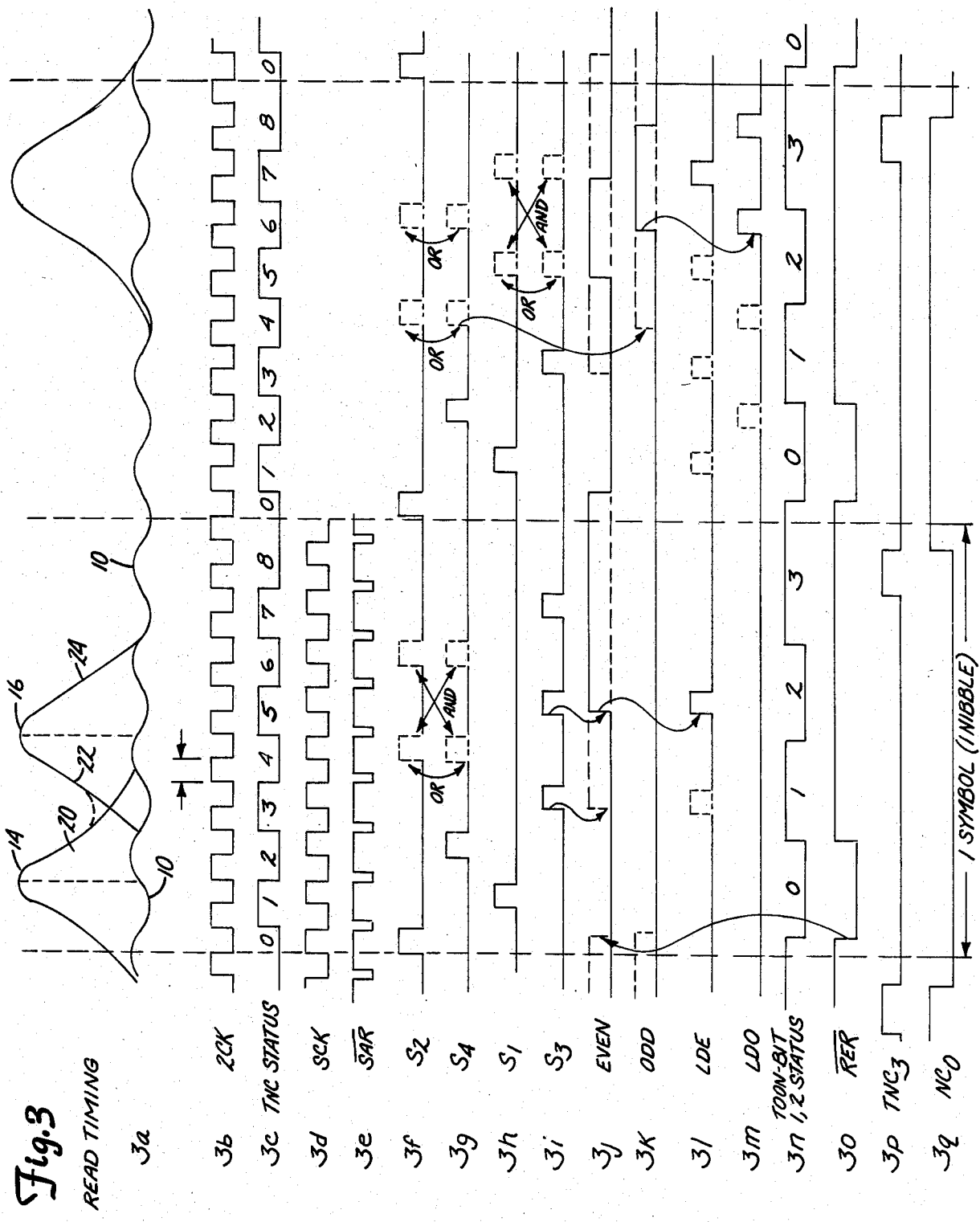

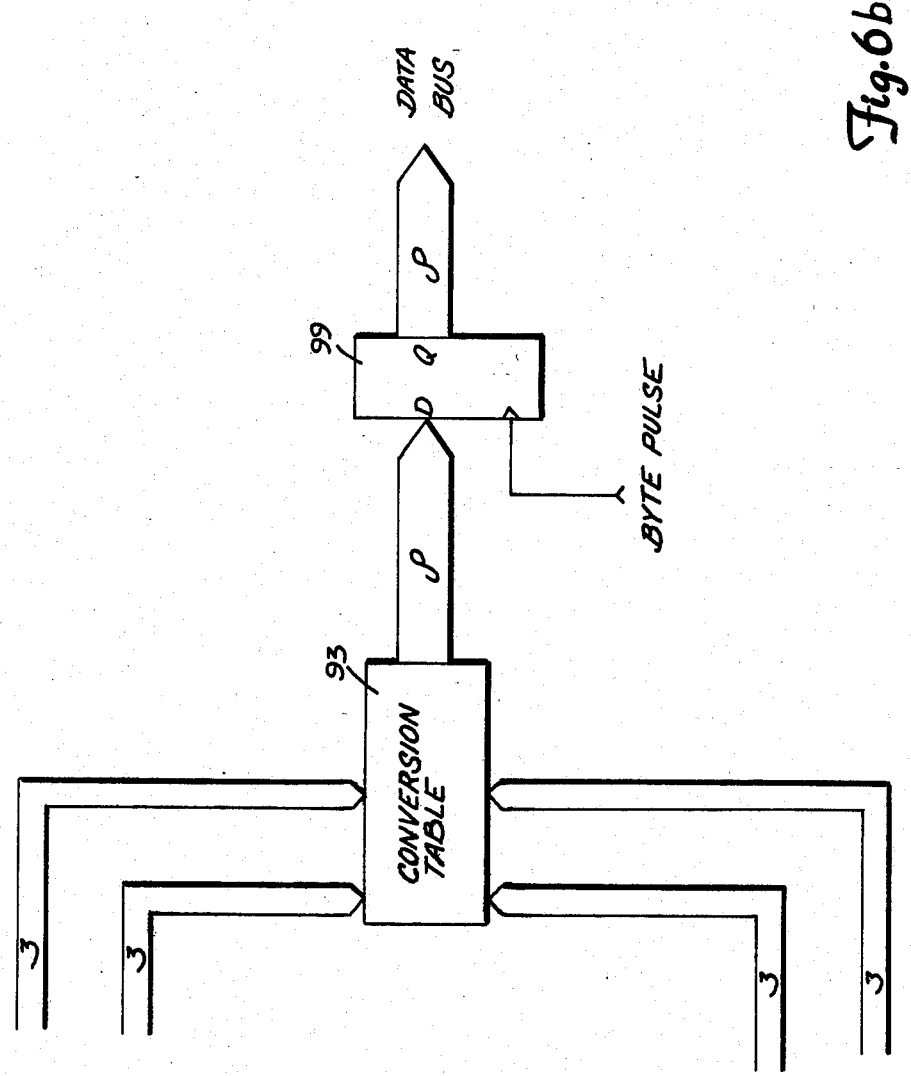

READ CHANNEL FOR AN OPTICAL RECORDER

This application is a continuation-in-part of application Ser. No. 578,151 filed 2/8/84, now abandoned Verboom J. inventor.

BACKGROUND OF THE INVENTION

1. Field of the Invention

The invention relates generally to the field of optical recording systems and more particularly to apparatus for detecting and decoding data therefrom.

2. Brief Description of the Prior Art

Prior art optical recorder systems using fixed block code formatted data read the data by first delaying the data so that the signal values of all symbol positions were present at a series of comparators at the same instant of time, at which time the comparators were operated to determine the two locations (assuming a code having two holes per symbol) within the symbol which had the highest signal values for the hole associated power of the reflected laser beam. (Hole associated power may be taken to mean the inverse of the power of the refelected laser beam.) These were the locations of the holes. Thereafter, the hole locations were converted from the fixed block code to binary using somewhat complex logic. The entire apparatus was somewhat complicated, expensive in the use of delay lines and comparators, and prone to failure due to loss of signal in the various delay lines.

SUMMARY OF THE INVENTION

The invention comprises breaking the apparatus which decodes the hole position of the fixed block codes separately for the even and odd symbol positions. For each, two sample and hold cells are provided, and these are input to one comparator. One sample and hold cell in each respective comparator is respectively clocked at the first even and the first odd symbol positions. The other is clocked at the next even or odd position. If the second is higher, the output of the comparator changes. If it is not, the output of the comparator does not change. In either case, the timing circuit knows which cell has the highest valued signal in it and clocks the other, the one with the lower valued signal, at the next even or odd symbol position. This process continues until all symbol positions have been sampled, except for the ninth, which is always empty. If a hole is present in the symbol in either the even or odd positions, the last time the comparator for the even or odd sample and hold will change is at the symbol. Every time the state of the respective even and odd comparators changes, a transition detector connected to the respective comparator, signals the change by generating an even or odd pulse. This even or odd pulse causes the output of a symbol position counter to be input into an even or odd register. The even and odd addresses of the holes in the symbol together form the four binary bits of the encoded information. Two consecutive symbols are decoded, and the eight bits of binary data encoded by the two symbols are formed into eight binary bits and output on a data bus.

BRIEF DESCRIPTION OF THE DRAWINGS

FIG. 3 is a timing diagram of various signals generated by the read channel of the present invention.

FIGS. 6a and 6b are block diagrams, of a variation on the invention for a 4/15 code.

DESCRIPTION OF THE PREFERRED EMBODIMENT

Figure 1:
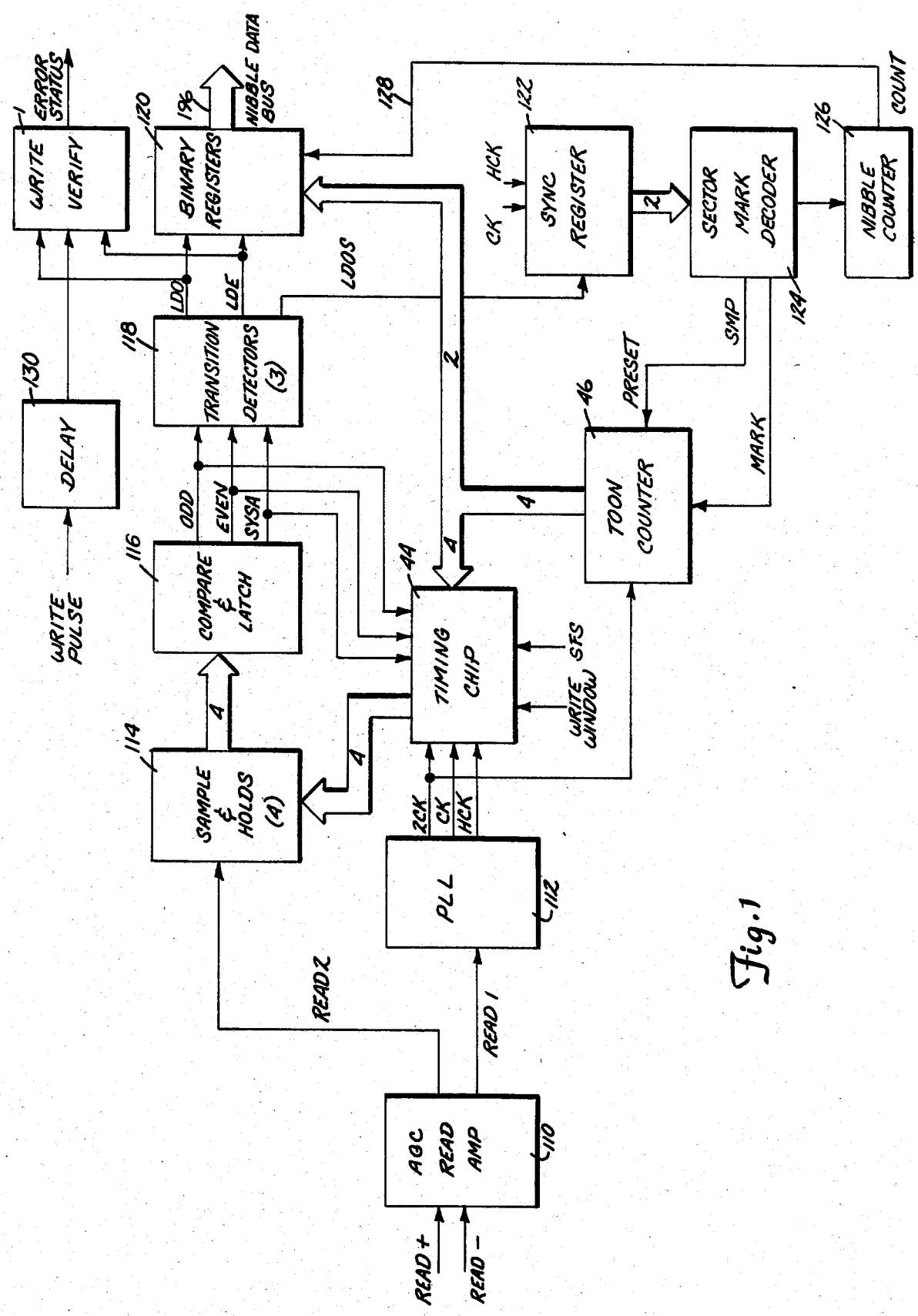
FIG. 1 is a block diagram of the read channel of the present invention.

FIG. 1 shows a block diagram of the read channel according to the present invention. The optical recorder reading the information from the optical disk does so conventionally by means of a laser operated at read power. The beam reflects from the disk, and the drop in reflection normally indicates the presence of a hole. (Note, here and throughout the specification and claims, the term hole is intended to include all forms of media state changes including those that change reflectivity). Because reflected spot density distributions have a Gaussian shape, the hole associated power of the reflected beam (the hole associated power means the inverse of the reflected power from the disk) spreads a significant distance beyond the boundaries of the holes themselves. Indeed, the hole power present at the center of the next possible position of a hole in closely spaced systems may be significant. Therefore, one cannot rely on threshold detectors to detect the presence of a hole, because the threshold may be reached due to a hole at an earlier or later position, or a combination of the two. Additionally, hole sizes vary widely causing corresponding wide variations in the amplitude of the signal indicative of the presence of holes. As well, prerecorded material, such as sector marks which the read system must also detect, cause drops in reflection far less that caused by burned holes. This necessitates a variation in the threshold level depending on the type of material being read. Moreover, other system variables negative the use of threshold detection. Among these are reflectivity variations from disk to disk and across a single disk, variations in laser power levels, optical efficiency, sense diode coupling errors, circuit tolerances, etc. For these reasons, an alternative method of detection of holes is desirable. The method employed by the preferred is that of differential detection.

The signal from the read detectors is input to the AGC 110 shown in FIG. 1, which outputs the amplified and limited signal on Read 1 and Read 2 outputs. The Read 1 output is input to a phase lock loop 112 which tracks a prerecorded clock inscribed in the optical disk, or if the code is self-clocking, the clock information present in the code. The phase lock loop outputs several clock signals, the most important of which is a 2CK clock at a frequency twice that of the prerecorded clock. This 2CK is input to a Timing Chip 44 and to a TOON counter 46. TOON is the name of the fixed block code of the preferred embodiment. The TOON Counter's essential purpose is to count the number of symbol positions to generate a symbol position address. The function of the Timing Chip 44 will be discussed infra.

The Read 2 signal is input to four gated sample and hold cells 114, two cells each for the respective even and odd symbol position of the TOON code. The sampling of the cells is controlled by Timing Chip 44. The outputs of the cells are input to two comparators 116, an even and an odd comparator respectively, which determine which of the two sample and hold cells has the highest hole associated signal power. The comparator outputs are fed back to Timing Chip 44 and to a transition detector circuit 118. The transition detectors detect a change in the state of the comparators 116 outputs and signal that change to a pair of binary registers 120, one 84 for the even and one 86 for the odd symbol positions, which record the address of the change. The address of the change as represented by the count on the TOON Counter 46 is divided by two ignoring the remainder. The binary registers are copied into one of two four-bit output registers 88, 90, at the end of a symbol. After two symbols have been recorded in the output registers, the optical disk recorder reads the eight binary bits of data out of the registers along a data bus 96.

The system also detects the presence of sector marks and this information is supplied to a sync register 122 which with decoder 124 decodes the location of the sector mark and initializes a TOON counter 46 and a nibble counter 126, which continues to count up by one each symbol until the next sector mark. The lowest order bit 128 of this nibble counter, nibble count 0, is provided to clock the output registers 88 and 90, as will be discussed infra.

The present invention pertains to an optical recording system which writes data on an optical disk in fixed-block format wherein binary data is encoded into a symbol having a predetermined number of positions in which a predetermined number of holes are recorded. The preferred embodiment uses a so-called TOON code which has eight positions in which holes may be written and one position in which no holes are written. The latter position is normally reserved at the end of the symbol. The TOON code is further constrained to have one hole written at an even position and one hole written at an odd position. Only two holes are written in the symbol.

Figure 2:
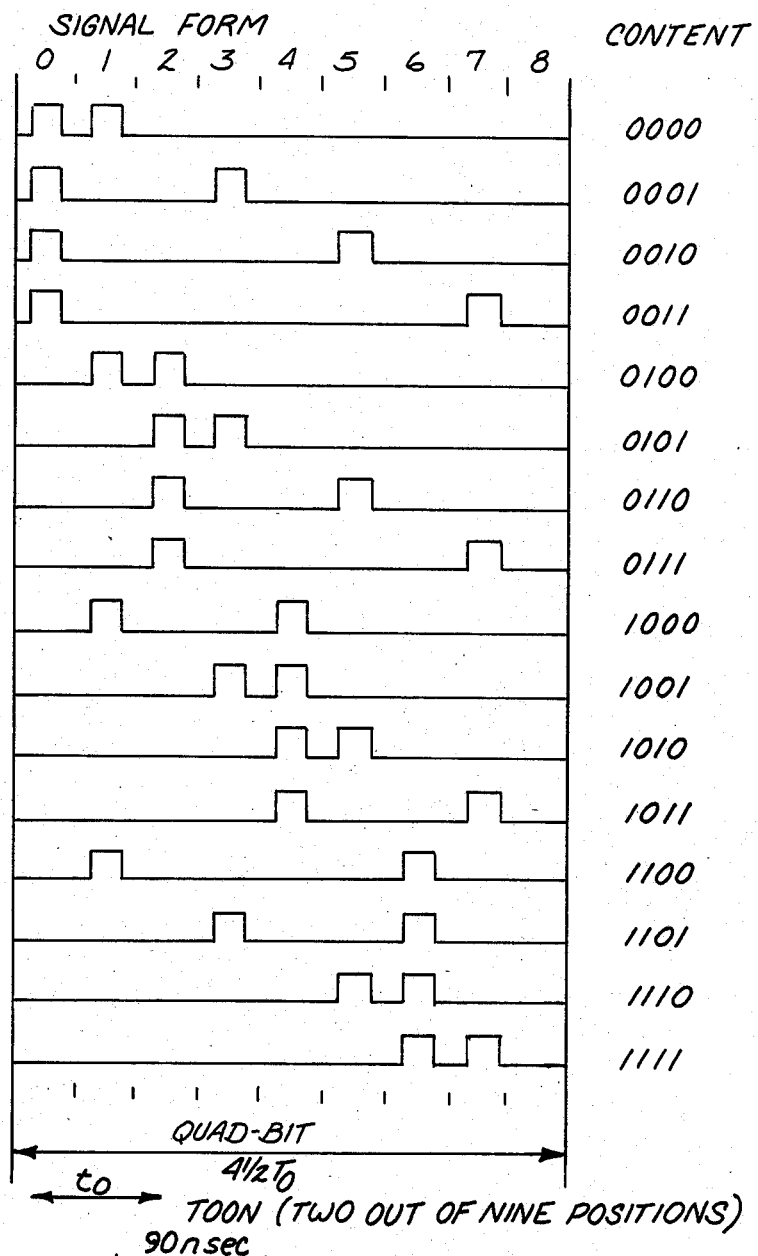
FIG. 2 shows the TOON code and its corresponding binary equivalent.

FIG. 2 shows the TOON code. It has nine positions numbered in the Figure from zero to eight. The ninth position, number eight, is the one constrained to never have a hole recorded in it. The other eight positions have one hole in an even position and one hole in an odd position. The code is shown in the Figure and the corresponding binary bit values are shown in the table to the right. Each symbol of the TOON code encodes four bits of information.

The code is recorded on the media in such a manner that four and one half clock periods, $T_o$, span the symbol. Referring to FIG. 3a, the prerecorded clock is illustrated as the sinusoidal line 10. It is from this signal that the phase lock loop generates the 2CK signal shown in FIG. 3b.

The fall of 2CK denotes the beginning of a symbol position and the rise of 2CK denotes the center of a symbol position. There are exactly nine 2CK clocks in a symbol.

FIG. 3c corresponds to the TNC0 bit out of the TOON Counter 46. It undergoes eight transitions during a symbol and the transitions occur at the center of a given symbol position. The numbers in the figure correspond to the number of the symbol position in which the next transition occurs. There is no transition in symbol position nine primarily because no hole will ever be recognized in this position even if a hole is somehow recorded therein.

Holes are preferably written at the center of a symbol position. To write a hole, the optical recording device generates a write pulse from a laser beam of approximately 60 nanoseconds in length. The symbol position length or the length of time for a symbol position to pass past a fixed location at typical operating speeds of the optical recording system of the preferred embodiment is 180 nanoseconds. The hole burned into the optical recording medium by such a write pulse is typically much larger than 60 nanoseconds in length and may be larger than the 180 nanoseconds length of a symbol position.

FIG. 3a shows the inverse of the power of the reflected laser beam for two typical symbols on the optical recording medium. The absence of reflection caused by the presence of a hole is shown as a positive signal, while the presence of reflection is indicated by a negative signal. The vertical dashed lines in the figure represent the boundaries at the edges of the symbols.

Again referring to FIG. 3a the optical recording surface reflection indicates the presence of holes at the center of symbol positions numbers 1 and 4 of the first symbol. The holes do not reflect the laser beam and the inverse of the signal detected by apparatus detecting the reflected beam will generate a high signal at 14 and 16 in the figure. As can be seen by inspection of the figure, the hole associated power 20 of a hole written at symbol position 1 will be present to a significant degree at symbol position 2.

The second positive going pulse in FIG. 3a represents a second hole written in the symbol at the center of symbol position 4. Here again, the line 28 represents the hole associated signal power which is received by the read system and detects the hole under normal reading conditions.

Assuming a defect in the media or perhaps a defect in the writing system, a hole may not be formed in the media. When the position is "read", the hole associated power of the read signal, such as for the first hole in the FIG. 3a, then does not follow line 20 but instead follows the line 10 which corresponds to the signal of the prerecorded clock.

The second symbol shows holes written at symbol positions 6 and 7. Note that the signal power from the two holes significantly overlap and the signal merges into one large bell-shaped curve.

Figure 4:
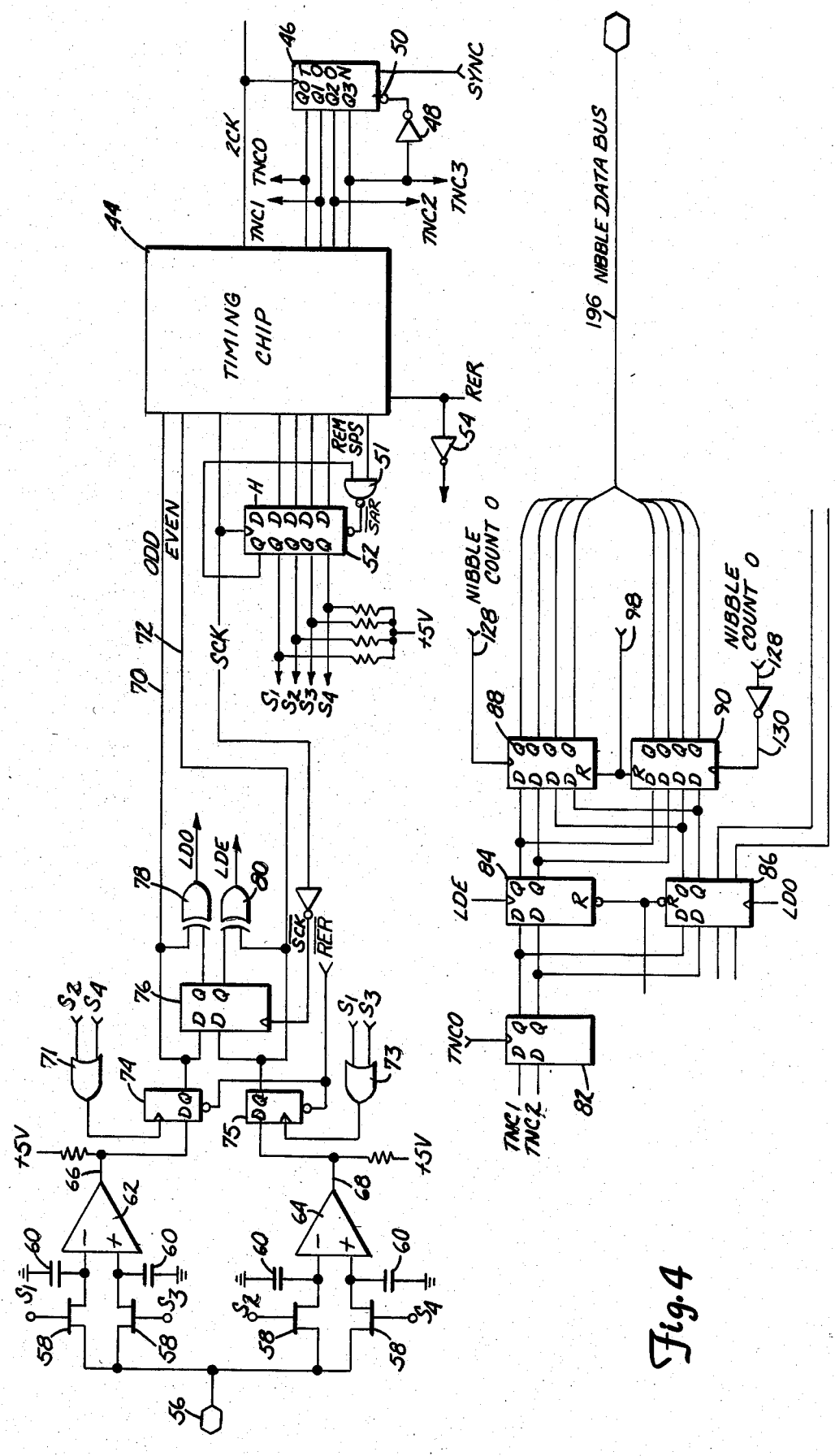
FIG. 4 is a schematic circuit diagram of the critical circuits of the present invention.

FIG. 4 shows apparatus first for detection of the location of a hole and secondly for generating binary output from the address of the holes for two consecutive symbols.

Referring to the top right-most part of FIG. 4, the 2CK clock derived from the phase lock loop 112 is provided as an input to both a Timing Chip 44 and a TOON counter 46. TOON counter 46 counts once for each cycle of the 2CK with its four-bit count on outputs TNC0, TNC1, TNC2, and TNC3, respectively. A count of 8, TNC3, synchronously (at the next clock) resets the counter to zero due to the inverter 48 feeding TNC3 back into master reset not 50 of the TOON counter 46. The state of TNC1 is shown at FIG. 3n and the state of TNC3 is shown at FIG. 3p.

The Timing Chip 44 also outputs an RER signal, which is inverted by inverter 54, to become an RER NOT signal. The signal RER is output once per symbol during the last half period of symbol position 0. See FIG. 3o. The purpose of RER is to signal the end of a symbol to various registers as will be discussed infra, and also resets other registers.

Figure 5:
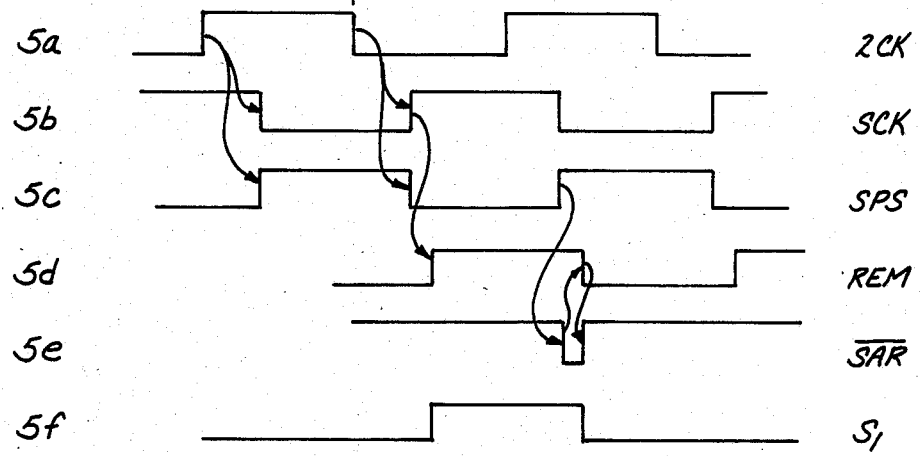
FIG. 5 is a timing diagram showing the fine timing differences between several of the signals of FIG. 3.

As can be seen from FIG. 3d, the Timing Chip outputs an S-clock ("SCK") which corresponds directly with the 2CK signal. SCK is delayed from 2CK by approximately 22.5 nanoseconds and inverted therefrom as can be seen from relative timing diagram FIG. 5.

The Timing Chip 44 also outputs through register 52 signals S1, S2, S3 and S4 and and REM signal. Signals S1–S4 are set by the rising edge of SCK clocking register 52. Signal SAR NOT resets register 52 and signals S1 through S4 and REM. SAR NOT is triggered at the falling edge of SCK, see FIG. 5 where it can be seen that at the fall of the SCK signal, which occurs 22.5 nanoseconds after the fall of the 2CK signal, causes the Timing Chip 44 to output a signal SPS (FIG. 5), which when coupled with an REM signal from register 52 (FIG. 5d) through NAND gate 51, generates an SAR NOT signal (see FIG. 5e) which resets register 52 and thereby resets signal S1 through S4 as can be seen from FIG. 5f, which shows the resetting of the S1 signal. It also resets REM, which in turn resets SAR NOT. Thus, the S1 signal is normally "on" for a period of approximately 90 nanoseconds from a point approximately 30 nanoseconds after the fall of the 2CK signal to approximately 30 nanoseconds after its rise.

Referring to the upper left-most of FIG. 4, the signals S1 to S4 control corresponding FET gates 58 between the Read 2 input 56 and respective grounded capacitors 60. The combination of a gate and a capacitor forms a sample and hold cell as is known to the art. The respective sample and hold cells will henceforth be referred by the respective signals controlling their gates, S1, S2, S3 and S4. The signal input on Read 2 line 56 corresponds to the hole associated power of the reflected laser beam as discussed above. Each of the capacitors 60 is also connected two each to respective comparators 62 and 64. Comparator 62 operates on the odd positions of a TOON symbol and comparator 64 operates on the even positions. Comparator 62 compares the signal value on the S1 sample hold with the signal value then present on the S3 sample and hold, while the comparator 64 compares the signal value in the S2 sample hold with signal value on the S4 sample and hold. The comparators output the results of the comparison on outputs 66 and 68, respectively, which are provided as respective inputs 70 and 72 to the Timing Chip 44 through flip flops 74 and 75.

During the first symbol position of a symbol, symbol position 0, an even position, sample and hold cell S2 is turned on to sample the signal at the first even cell. During the first odd position, position number 1, sample and hold S1 is turned on to sample the signal at the first odd cell. The signals present on the Read 2 line 56 during these symbol positions are copied into the corresponding capacitors 60 of the sample and hold cells. At the next even position, sample and hole cell S4 is triggered to record the signal level at symbol position number 2, and at the next odd position, sample and hold cell S3 is triggered to record the signal level at symbol position at symbol position number 3. Comparator 62 compares the value of sample and hold cells S1 and S3, the odd sample and holds, and comparator 64 compares the value of sample and hold cell S2 and S4, the even sample and hold cells. If, for example, the results of this former comparison indicate that S1 sample and hold value exceeds the S3 sample and hold value, the output 66 of the comparator 62 will be low. Output 68 will similarly be low if S2 exceeds S4. The Timing Chip 44 then saves the higher of the two values, S1 (S2). It does this at the next occurrence of an odd (or even) cell by triggering the other sample and hold S3 (S4), which then holds the lowest valued signal of the two. If again the S1 (S2) sample and hold contains the highest value at the next occurrence of an odd (even) symbol position, the S3 (S4) sample and hold is again triggered. This process continues throughout the symbol with the highest valued sample and hold cell retained and compared with the next sampled value. At the end of the symbol, one of the sample and holds of each comparator will contain the highest valued signal, and this signal corresponds to signals generated by the holes within the symbol, if there were holes recorded there.

Referring to the example shown in FIG. 3a, when the S1 sample and hold cell is triggered at position 1 in the first symbol, it samples the signal caused by the first hole 20 shown in the example. The sample and hold samples a read signal at approximately the level indicated at point 14 on FIG. 3a. Sample and hold cell S3 is next triggered at position 3 and samples a signal approximately the level indicated at point 22 in FIG. 3a. As can be seen by inspection of FIG. 3a, the signal level at point 14 is higher than the signal at point 22. Therefore, the S1 sample and hold and is retained. At the next occurrence of an odd symbol, at symbol position 5, the Timing Chip 44 determines that S1 now contains the highest signal and triggers the S3 sample and hold. By inspection of FIG. 3a, it can be seen that the signal level at this point 24 is higher than the reference clock signal but lower than the peak value 14 of the signal at position 1. Thus, S1 continues to contain the higher of the two values. Timing Chip 44 triggers S3 at the last odd position, position number 7. This value is again less than the value in sample and hold cell S1. (The sequence of triggering of S1 and S3 just described is shown at FIGS. 3h and 3i.)

If at any time the two signal levels present in the respective sample and holds are about equal, which may occur when the holes are recorded later in the symbol, the state of the comparators 62 or 64 is indeterminate. Either one of the two is retained for the next symbol. This feature is illustrated by the dashed lines shown in FIGS. 3f and 3g which show the triggering of the S2 and S4 sample and hold cells.

The FIGS. 3f to 3i also show the triggering of the sample and hold cells S1 through S4 for the second exemplary symbol shown in FIG. 3a.

Timing Chip 44 recognizes the finding of a new higher valued signal by the change in the outputs of the comparators 64 or 62 as can be seen by inspection of FIGS. 3j and 3k, which show the state of the outputs of the flip flops 75 and 74 which are coupled to the even and odd comparators respectively. Note that RER NOT initializes flip flops 74 and 75 at the beginning of a symbol.

The outputs of the comparators 62 and 64 are provided as inputs to respective flip flops 74 and 75, whose outputs are in turn provided to register 76 and as one input to exclusive-OR gates 78 and 80. The outputs of register 76 are provided as the other inputs to exclusive-OR gate 80. Flip flops 74 and 75 are clocked by OR gates 71 and 73 respectively, which form the logical OR of the signals S2 and S4, and S1 and S3 respectively. This method of clocking these flip flops assures that the outputs of the comparators are sampled after the comparators have changed state. Flip flops 74 and 75 are clocked for an even position at the next odd position and for an odd position at the next even position. Further the state of these flip flops remains steady for a predetermined period, which cannot be said for the state of the comparators 62 and 64.

Register 76 is clocked by the inversion of SCK approximately 90 nanoseconds after the clocking of flip flops 74 and 75. The exclusive-OR gates 78 and 80 compare the outputs of the comparators 62 and 64 from one even or odd symbol position to another and generate a pulse of approximately 90 nanoseconds duration if the outputs change. Exclusive-OR gate 78 is indirectly connected to the output 66 of comparator 62. FIG. 31 shows the pulse LDO out of exclusive-OR gate 78 indicative of the changes in the relative signal levels in the S1 and S3 sample and holds discussed heretofore. Exclusive OR gate 80 is indirectly connected to the output 68 of the comparator 64. FIG. 3m shows the pulse out of exclusive-OR gate 80 indicative of the changes in the relative signal level of sample and hold cells S2 and S4 discussed above. The load odd and load even pulses LDO and LDE occur only when a new "higher" signal level has been recognized by the respective comparators.

Referring again to FIG. 2, it can be seen from inspection that there is a systematic correspondence between the location of the even position symbol and the first two binary bits and likewise a systematic correspondence between the location of the odd symbol and the second two binary bits. The correspondence is that the symbol position address divided by 2, ignoring fractions, directly converts the symbol location into the binary equivalent for the two corresponding bits.

Referring again to FIG. 4, the symbol position address divided by two, ignoring fractions, is just the state of the TNC1 and TNC2 outputs from TOON counter 46. These outputs are therefore provided to an address register 82. The state of these outputs changes every other transition of TNC0. Therefore, TNC0 clocks the address register 82. The outputs of the address register 82 are provided to even and odd binary registers 84 and 86 respectively.

These registers 84 and 86 are in turn clocked by LDE and LDO respectively. These latter signals occur, as noted above, each time the state of the comparators 64 and 62 change; however, the last time they change corresponds to the location of the holes, as the holes generate the highest hole associated signal power. Therefore, these even and odd binary registers are clocked the last time in the symbol at the location of the respective even and odd holes, and the then current address of the respective holes (divided by 2, ignoring the remainder) then present in address register 82 is copied into binary registers 84 and 86.

As the combination of these two binary registers 84 and 86 yields the correct four-bit decoding for the symbol, the outputs of these two registers are provided to a first symbol four-bit register 88, which contains the four bits decoded from the first symbol of pair of symbols which encode a eight bit byte of data, and also to a second symbol four-bit register 90, which contains the four binary bits decoded from the second of a two-symbol pair. The first symbol four bit register 88 is clocked by the nibble count 0 (128) signal from the nibble counter 126 coupled to sync mark decoder 124, and the second symbol four bit register 90 is clocked by the inversion 130 of nibble count 0. As mentioned above, the nibble counter 126 counts the number of symbols in a sector and nibble count 0 (128) undergoes a positive transition every other symbol.

At the end of a symbol, the binary registers are reset by the RER NOT signal. At the end of two symbols, the data for one byte is read out on data bus 96 to the optical recording system, which issues an acknowledge signal 98, which in turn resets the two four bit registers 88 and 90.

The above apparatus was described in conjunction with a TOON code. Other codes having a null in the frequency spectrum are compatible with a prerecorded clock. One such code is a so-called 4/15 code in which there are 4 holes, two each in the even positions and two each in the odd positions. One position is left empty at the boundary. With this code, means must be provided to detect the highest signal for both the even and the odd positions, and the second highest. To do this, one merely has to have three sample and holds instead of two, as well as three comparators. One sample and hold would hold the highest value, the second would hold the next highest and the third would hold the new sample to be compared with the other two. The results of the comparison would indicate whether we had a new highest or a new second highest value. These results could be latched and fed back through to the Timing Chip, as well as to the address decoder which would convert the addresses of the holes into binary.

Figure 6A:
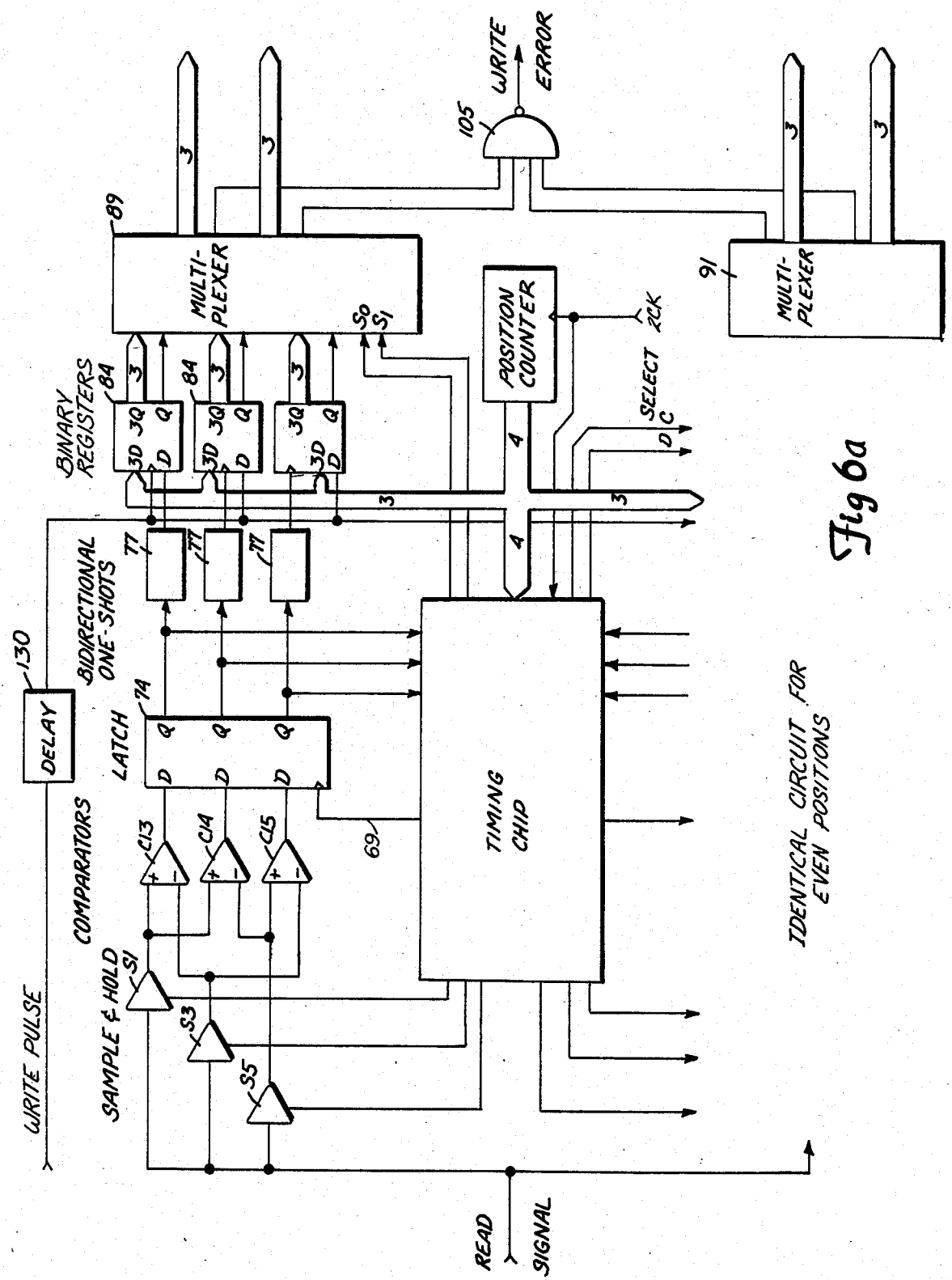

Apparatus for decoding the 4/15 code is shown in FIG. 6. The figure shows a block diagram of the odd sample and holds and corresponding decoding apparatus. Identical apparatus for the even positions is not shown. The three odd sample and holds S1, S3 and S5 are shown. S1 is triggered at the first odd position, S3 the next odd and S5 at the third odd position. The outputs of the sample and holds are input to three comparators C13, C15 and C35 which compare the outputs of the corresponding sample and holds. These are latched as described above in a latch 74, now having 3 inputs and outputs, and clocked by the occurrence of an even symbol position with a signal 69 from Timing Chip 44 (or an OR gate 71 as above described). The outputs of the latches are fed back to the Timing Chip 44 as before and in turn fed into bidirectional one shots or transition detectors 77 which issue a pulse if a change in the latch output to which it is connected is detected. In response to the three latched feedbacks, the Timing Chip may now determine the relative magnitude of the signals in the three sample and holds and trigger the one with the lowest value at the next odd position. This sequence continues until the last odd position in which a hole may be recorded, the lowest valued sample and hold being the one next triggered.

In response to a pulse from the one-shots 77, the binary registers 84 load the address from the position counter 46, the lowest order bit clocking the next three higher bits. From the final state of the latched comparators, the Timing Chip knows which one has the lowest value, the next highest and the highest value. This information is provided to a multiplexer 89 via select lines $S_0$ and $S_1$. The multiplexer places on its two sets of outputs the addresses contained in the two selected binary registers. The multiplexed outputs are provided to a conversion table 93, which converts the addresses of the four holes into binary and provides the results to a register 99, which is clocked by a byte pulse once per byte. Because the 4/15 code encodes eight bits, this byte pulse occurs every symbol.

The method of the preferred embodiment is intended to be general with respect to the class of codes having a null in the frequency spectrum at the frequency of the prerecorded clock. These codes may have any number of holes in the odd and even positions. There must be a sample and hold cell for each such hole, even and odd, plus one. The extra one is the one triggered at the next even or odd position. There are a sufficient number of comparators to determine which is the lowest, next lowest, etc. This requires that each of the sample and holds be interconnected with a comparator to each of the other sample and holds. This requires $n(n-1)/2$ comparators, where n is the number of sample and hold cells. Each comparator must be latched and fed back to the Timing Chip 44 and also fed to transition detectors which detect a change in the latched output. The transition detectors issue a one shot to the binary registers, which load the address of the "hole" by loading the count of a position counter 46 as clocked by the lowest order bit of the count. The final state of the latched comparators reveals those binary registers containing addresses of holes as opposed to spurious information, and these addresses can be decoded by a decoder into binary.

A preferred 4/15 code is shown below. This code is especially adapted for use in conjunction with the decode electronics shown in FIGS. 7 and 8. The code breaks the fourteen positions where holes may occur into two sets, even and odd, because the code must have two even and two odd holes. Each set is then encoded or decoded separately with greatly reduced logic vis-a-vis decoding 14 positions. Further, each set is is constructed identically. This structure permits direct conversion between binary hex digits and code sets. That is, eight binary bits are interpreted as two digits of four which may be represented symbolically as two hex digits. Each digit is encoded or decoded separately and corresponds to the even or odd set of the 4/15 code. In the preferred embodiment, the first four bits or hex digit corresponds to the odd set of the 4/15 code, while the second four bits or hex digit corresponds to the even set of the 4/15 code.

The actual code structure is as follows:

| FIRST DIGIT | ODD SET HOLE POSITIONS | | | | | | |
|---|---|---|---|---|---|---|---|
| | 1 | 3 | 5 | 7 | 9 | 11 | 13 |
| 0 | X | X | | | | | |
| 1 | X | | X | | | | |
| 2 | X | | | X | | | |
| 3 | X | | | | X | | |
| 4 | X | | | | | | X |
| 5 | | X | X | | | | |
| 6 | | X | | X | | | |
| 7 | | X | | | X | | |
| 8 | | X | | | | | X |
| 9 | | | X | X | | | |
| A | | | X | | X | | |
| B | | | X | | | | X |
| C | | | | X | X | | |
| D | | | | X | | | X |

| FIRST DIGIT | ODD SET HOLE POSITIONS | | | | | | |
|---|---|---|---|---|---|---|---|
| | 1 | 3 | 5 | 7 | 9 | 11 | 13 |
| E | | | | | X | | X |
| F = | X | X | | | | | |
| | | X | X | | | | |
| | | | X | X | | | |
| | | | | X | X | | |
| | | | | | X | X | |

| FIRST DIGIT | EVEN SET HOLE POSITIONS | | | | | | |
|---|---|---|---|---|---|---|---|
| | 2 | 4 | 6 | 8 | 10 | 12 | 14 |
| 0 | X | X | | | | | |
| 1 | X | | X | | | | |
| 2 | X | | | X | | | |
| 3 | X | | | | X | | |
| 4 | X | | | | | | X |
| 5 | | X | X | | | | |
| 6 | | X | | X | | | |
| 7 | | X | | | X | | |
| 8 | | X | | | | | X |
| 9 | | | X | X | | | |
| A | | | X | | X | | |
| B | | | X | | | | X |
| C | | | | X | X | | |
| D | | | | X | | | X |
| E | | | | | X | | X |
| F = | X | X | | | | | |
| | | X | X | | | | |
| | | | X | X | | | |
| | | | | X | X | | |
| | | | | | X | X | |

The symbols for F for each set depend upon the state of the other set and are chosen such that when combined with the holes of the other set three holes occur in a row. For example:

| 1st DIG. | 2nd DIG. | HOLE POSITIONS | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| 0 | F | X | | | X | X | X | | | | | | | | |
| 5 | F | | | X | | | | | X | X | X | | | | |
| F | 0 | | X | | | X | X | X | | | | | | | |
| F | 3 | X | X | X | | | | | | | | | X | | |

The symbol for F F is defined to be

| 1st DIG. | 2nd DIG. | HOLE POSITIONS | | | | | | | | | | | | | |
|---|---|---|---|---|---|---|---|---|---|---|---|---|---|---|
| | | 1 2 3 4 | 5 | 6 | 7 | 8 | 9 | 10 | 11 12 13 14 |
| F | F | | | | X | X | X | X | |

The above code defines all possible combinations of 8 binary bits, however it does not exhaust all permissible combinations for the 4/15 code. Remaining combinations may be used for special functions or for synchronizations. The encoder and decoder may signal a special function by the use of a flag:

| FLAG | 1st | 2nd | HOLE POSITIONS | | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| M | 5 | F | | X | X | X | | | X | | | | | | | |
| M | 6 | F | | X | X | X | | | | | X | | | | | |
| M | 7 | F | | X | X | X | | | | | | | X | | | |
| M | 8 | F | | X | X | X | | | | | | | | | X | |
| M | F | 3 | | X | | | | | | | | | | X | X | X |

-continued

| FLAG | 1st | 2nd | \multicolumn{14}{c}{HOLE POSITIONS} |
|------|-----|-----|---|---|---|---|---|---|---|---|---|----|----|----|----|----|

| FLAG | 1st | 2nd | 1 | 2 | 3 | 4 | 5 | 6 | 7 | 8 | 9 | 10 | 11 | 12 | 13 | 14 |
|------|-----|-----|---|---|---|---|---|---|---|---|---|----|----|----|----|----|
| M | F | 7 | | | | X | | | | | | | X | X | X | |
| M | F | A | | | | | | X | | | | | X | X | X | |
| M | F | C | | | | | | | | X | | | X | X | X | |
| M | 0 | 0 | X | X | X | X | | | | | | | | | | |
| M | 1 | 1 | | X | X | X | X | | | | | | | | | |
| M | 2 | 2 | | | X | X | X | X | | | | | | | | |
| M | 3 | 3 | | | | X | X | X | X | | | | | | | |
| M | 4 | 4 | | | | | X | X | X | X | | | | | | |
| M | 5 | 5 | | | | | | X | X | X | X | | | | | |
| M | 6 | 6 | | | | | | | X | X | X | X | | | | |
| M | 7 | 7 | | | | | | | | X | X | X | X | | | |
| M | 8 | 8 | | | | | | | | | X | X | X | X | | |
| M | 9 | 9 | | | | | | | | | | X | X | X | X | |

Apparatus for reading the 4/15 code from the optical disk discussed in relation to FIG. 6 returns the location of the holes as three digit addresses, the even and odd set of holes being treated separately. Thus the even set of symbol positions is comprised of the set 2,4,6,8,10,12,14 and the odd positions the set 1,3,5,7,9,11,13. An even address of 3 states that a hole occurs at symbol position 8, etc. Because four holes occur in a symbol, two each for the even and odd sets, the read electronics returns two addresses for each set. The addresses for each set are input to a single ROM, which outputs an eight bit (nine bit if the flag is used) binary byte. Note that as each "F" digit state depends upon the state of the other digit, as a practical matter all four three-bit address must be analyzed simultaneously to properly decode the 4/15 code above disclosed. This requires a single 4096×8 (or 9) ROM.

Figure 7:
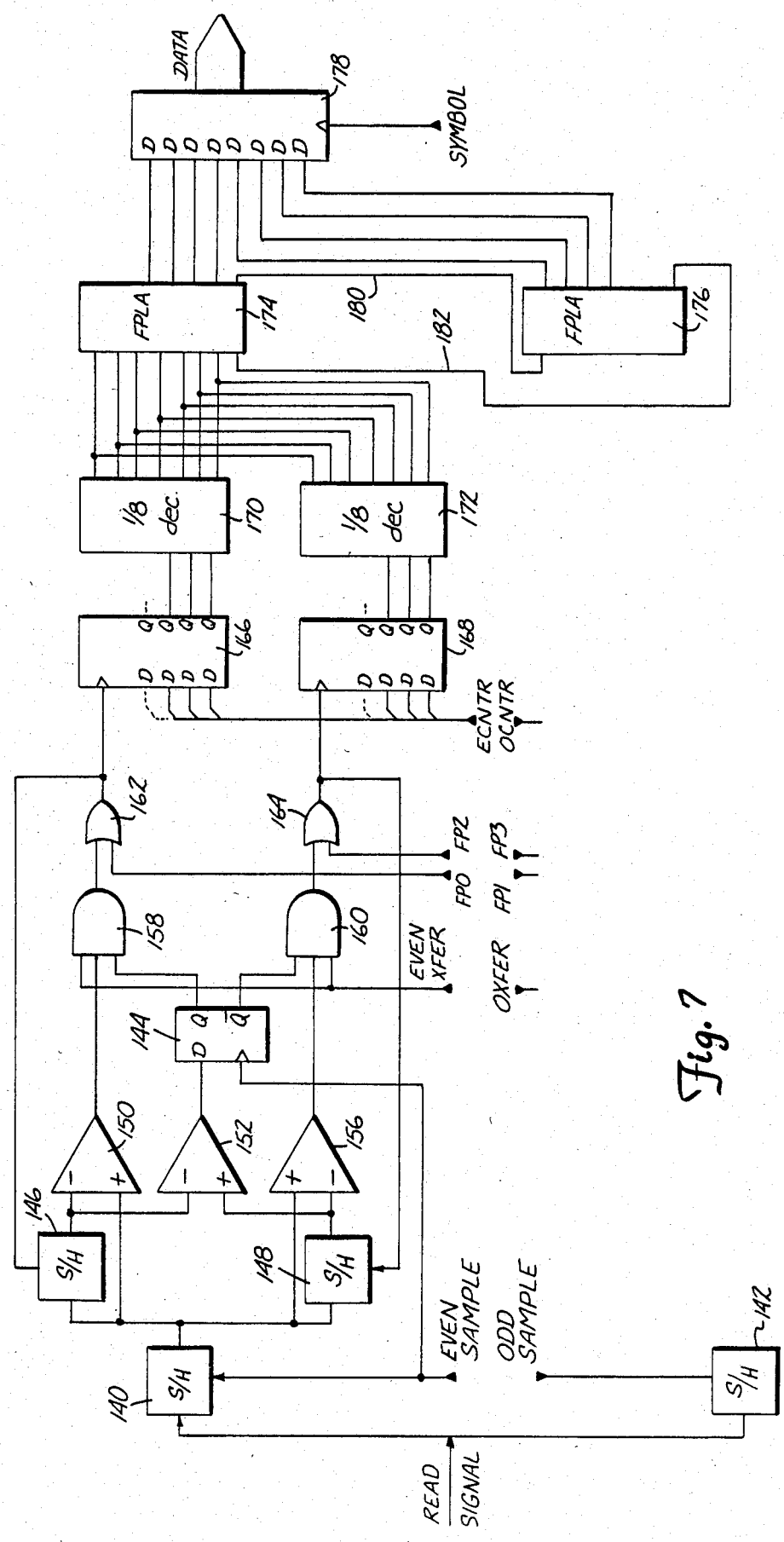
FIG. 7 is a rough schematic of an alternative approach to decoding the 4/15 code.
Figure 8:
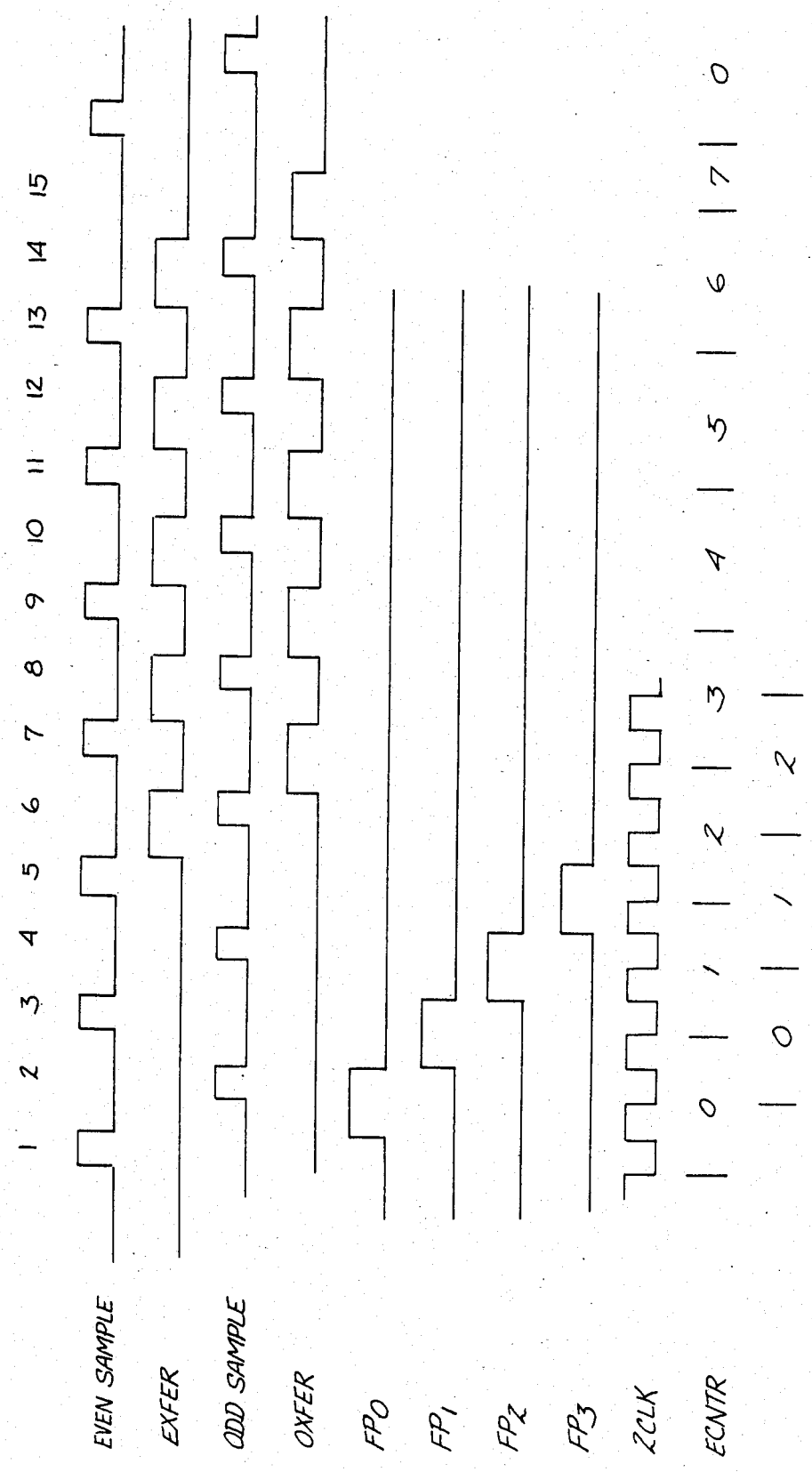
FIG. 8 is a timing diagram for the circuit shown in FIG. 7.

An alternative approach to decoding the 4/15 code is disclosed in FIGS. 7 and 8. FIG. 7 shows a rough schematic of the circuits which may read and decode the 4/15 code from an optical disk and FIG. 8 shows a timing diagram for use in conjunction therewith. The timing signals shown in the Figures may be provided by a Timing Chip such as shown in FIG. 6.

Briefly the circuit functions as follows: The odd and even symbol positions are decoded separately. The read signal from a preamplifier (not shown) is input (Read Signal input) to sample and holds for the even 140 and odd 142 symbol positions respectively. The Odd Circuit (see Figure) is not shown in detail. It is an exact duplicate of the Even Circuit. The Odd Circuit timing details are shown in FIG. 8, and except for a one position offset, they are exactly the same as the read timing signals. Therefore, the discussion to follow is fully applicable to the odd symbol position circuit.

The 4/15 symbol has fifteen positions as shown in the timing diagram. At symbol position 1 (which in the lexicon used herein for these two Figures only is an "even" symbol position) an Even Sample signal triggers an even sample and hold 140 to copy the signal present on the Read Signal input. It triggers a flip flop 144, which then copies the state of comparator 152 (the state of which at this time is indeterminate).

At symbol position 2, the Timing Chip provides a signal $FP_0$ to an OR gate 162. This signal causes register 166 to copy the state of a counter shown figuratively as ECNTR in the figures. The count varies from 0 to 7, incrementing by one every other symbol position. See the timing diagram. The state of the counter at this time is 0, and this is what register 166 copies.

The triggering of OR gate 162 also triggers sample and hold 146 to copy the state of sample and hold 140.

At this juncture, the level of sample and hold 146 should be higher than the other two sample and holds.

At symbol position 3, the Even Sample signal again triggers sample and hold 140 and flip flop 144. Sample and hold 146 remains greater than 148, and flip flop 144 remains or goes to a zero state.

At symbol position 4 the Timing Chip outputs a signal $FP_2$ which triggers OR gate 164, register 168 and sample and hold 148. The address copied into register 168 is the address 1. The Sample and hold 148 level may or may not be greater than sample and hold 146 level at this time. This depends upon whether or not holes were present at these positions and the strength of the signals caused by the holes. However, both would contain signal levels greater than the signal level in sample and hold 140.

At symbol position 5 the Even Sample signal again triggers sample and hold 140 and also triggers flip flop 144 to copy the state of comparator 152 which reflects the state of sample and holds 146 and 148. If the former's signal level is less than the latter's, the flip flop sets to a 1, while if the opposite is the case, it will remain a 0.

At symbol position 6, the Timing Chip issues an Even Xfer signal which is input to AND gates 158 and 160. The other inputs to AND gate 158 are the Q output of flip flop 144 and the output of a comparator 150, which determines whether the signal in sample and hold 140 is greater than the signal in sample and hold 146. If it is, and the signal in sample and hold 148 is greater than the signal in sample and hold 146 (the Q output is high) then all inputs to the AND gate 158 are high and its output goes high. This essentially means that a new, higher-valued signal has been found vis-a-vis sample and hold 146. OR gate 162 now goes high triggering register 166 to copy the address of the higher-valued signal and triggering sample and hold 146 to copy its signal from sample and hold 140. The signal is copied into sample and hold 146 rather than 148 because the signal in 146 was lower than the signal in 148.

If the opposite is the case, the Q NOT output of flip flop 144 would be high. This output is provided to AND gate 160. If the value of the new signal in sample and hold 140 is also greater than the value of the signal in sample and hold 148 as reflected by the output of comparator 156, which is the final input to AND gate 160, then the Even Xfer signal causes the AND and the OR gate 164 to go high, which then causes the register 168 to copy the address of the new higher-valued signal and also causes sample and hold 148 to copy the higher-valued signal from sample and hold 140.

This process continues for the rest of the symbol, except for position 15 which is constrained to never have a hole recorded therein. Every time the new signal recorded in sample and hold 140 exceeds the lower-valued signal of either sample and hold 146 or 148, the signal is copied into this lower-valued signal sample and hold and the address where the new higher-valued signal occurred is recorded in register 166 or 168. At the end of the symbol, registers 166 and 168 have recorded in them the addresses of the two highest valued "even" signal. These are presumptively the addresses of the holes.

These addresses are converted to the actual hole location in a representative symbol by $\frac{1}{8}$ decoders 170 and 172, the outputs of which are combined and input to a commercially available field programmable logic array (FPLA) 174 which converts the input pattern of two-out-of-seven to a four-bit pattern.

"F" codes are recognized by noting that all codes other than F have at least a distance of 2 between addresses while F alone has a distance of one. If the special function codes are eliminated from the code possibilities, no connections are needed between the FPLA's to signal the decoding of such. However, if special functions are to be included, the presence of an F in one of the two FPLA's 174 must be communicated to the other to correctly decode the other's two-out-of-seven inputs into its four bit output. These feedbacks are shown as lines 180 and 182 in the figure.

At the end of a symbol, the Timing Chip signals such via a signal Symbol, which triggers register 178 to copy the two sets of four-bit outputs from the even (174) and odd (178) FPLA's respectively. The register's eight outputs are then provided to a data channel.

The enumeration of the elements of the preferred embodiment are not to be taken as a limitation on the scope of the appended claims, in which

We claim:

1. Apparatus for differential decoding of data read from a medium encoded in a fixed block code comprising a plurality of symbols, each symbol having a plurality of symbol positions, each symbol position comprising a hole or a space, there being a predetermined number, n, of holes in a predetermined subset, m, of the symbol, the apparatus comprising:

counter means for counting symbol positions within a symbol;

a predetermined number, p, of sample and hold means responsive to read signals read from the fixed block encoded medium, wherein p is greater than or equal to n and less than m;

means responsive to the counter means for triggering said predetermined number, p, of successive of said plurality of sample and hold means at successive positions of said subset, beginning at the first position of the subset;

comparator means for determining the comparative strength of the signals contained in said plurality of sample and hold means;

trigger means responsive to the counter means and said comparator means for triggering the then lowest-valued signal containing of said plurality of sample and hold means at further successive positions of said subset until and including the last position of said subset when a read signal contains a higher-valued signal than the signal in said then lowest-valued signal containing sample and hold means; and p address means responsive to said counter means and to said trigger means for determining and remembering the symbol position address within said subset at which a corresponding one of said sample and hold means was triggered.

2. The decoding apparatus of claim 1 wherein p=n and the p address means contain the addresses of the n holes.

3. The decoding apparatus of claim 1 wherein p is greater than n and there is further included means responsive to said comparator means for determining which of the p sample and hold means contains the n highest-valued signals, and for outputting in response to said determination the addresses contained in the corresponding address means.

4. The decoding apparatus of claim 3 further including means for inverting said read signals to an inverted read signals and said highest-valued signals comprise the lowest-valued inverted signals and said lowest-valued signals comprise the highest-valued inverted signals.

5. The decoding apparatus of claim 1 further including means for inverting said read signals to an inverted read signals and said lowerst-valued signals comprise the highest-valued inverted signals.

6. Apparatus for differential decoding of fixed-block encoded data comprising signals read from an apparatus having data recorded thereon in a fixed-block code, comprising TOON counter means for counting the symbol positions within a symbol, including means for initializing said TOON counter after reaching the count of the last symbol position of the symbol;

a pair of even sample and hold cells, responsive to read signals from an apparatus reading data from a medium having data recorded thereon in a fixed-block format comprising symbols having a predetermined number of symbol positions in which holes may be written;

a pair of odd sample and hold cells responsive to said read signals from an said apparatus reading data from said medium having data recorded thereon in a fixed-block format;

means responsive to said TOON counter means for triggering a first of said even pair of sample and hold cells at the first even symbol position of a symbol;

means responsive to said TOON counter means for triggering a second of said even pair of sample and hold cells at the second even symbol position of a symbol;

even comparator means for comparing the first even sample and hold cell value with the second even sample and hold cell value and for generating an even comparator output indicative of the results of the comparison;

means responsive to said TOON counter means and to said even comparator means for retaining the value in the even sample and hold cell having the higher value and for triggering the other even sample and hold cell at the next even symbol position and for repeating said retention and said triggering of the other even sample and hold cell at the occurrence of every even symbol position for which the fixed-block code may contain a hole;

means responsive to said TOON counter means for triggering a first of said odd pair of sample and hold cells at the first odd symbol position of a symbol;

means responsive to said TOON counter means for triggering a second of said odd pair of sample and hold cells at the second odd symbol position of a symbol;

odd comparator means for comparing the first odd sample and hold cell value with the second odd sample and hold cell value and for generating an odd comparator output indicative of the results of the comparison;

means responsive to said TOON counter means and to said odd comparator means for retaining the value in the odd sample and hold cell having the higher value and for triggering the other odd sample and hold cell at the next odd symbol position and for repeating said retention and said triggering of the other odd sample and hold cell at the occurrence of every odd symbol position for which the fixed-block code may contain data;

even binary register means responsive to a change in the state of said even comparator output for recording the count of said TOON counter divided by two, ignoring fractions;

odd binary register means responsive to a change in the state of said odd comparator output for recording the count of said TOON counter divided by two, ignoring fractions;

output register means for loading the contents of said even and said odd binary register means into at least one output register at the end of a symbol.

7. The decoding apparatus of claim 6 wherein said output register means includes means for loading the contents of said binary register means into alternate ones of two output registers at alternate symbols.

8. The decoding apparatus of claim 6 further including means for reading the contents of said two output registers every other symbol and for resetting both of said output registers.

9. The decoding apparatus of claim 6 wherein said even comparator means includes an even latch for holding the state of the even comparator means and means for triggering the even latch at every occurrence of the triggering of one of said odd sample hold cells.

10. The decoding apparatus of claim 9 wherein said even binary register means included means for retaining the state of the output of said even latch for one symbol position and means for exclusive-ORing the output of the even latch with the retained even latch output contained in the even retaining means.

11. The decoding apparatus of claim 6 wherein said odd binary register means included for retaining the state of the output of said odd latch for one symbol position and means for exclusive-ORing the output of the odd latch with the retained odd latch output contained in the odd retaining means.

12. The decoding apparatus of claim 6 wherein said odd comparator means includes an odd latch for holding the state of the odd comparator means and means for triggering the odd latch at every occurrence of the triggering of one of said even sample hold cells.

13. The decoding apparatus of claim 6 wherein said even and said odd binary register means includes address means for latching the binary count of said TOON counter excluding the lowest and highest order bit of the count in response the lowest order bit of the count.

14. The decoding apparatus of claim 6 wherein each of said means responsive to said TOON counter for triggering an odd or an even sample and hold cell at any position of a symbol includes timing means for triggering said odd or even sample and hold cell during the first half of the symbol position and terminating the triggering shortly after the first half of the symbol position.

15. The decoding apparatus of claim 6 further including means for inverting said read signals comprise to an inverted read signals and said higher-valued signals comprise the lower-valued inverted signals and said lower-valued signals comprise the higher-valued inverted signals.

16. Apparatus for differential decoding of fixed-block encoded data comprising signals read form an apparatus having data recorded thereon in a fixed-block code, comprising symbol counter means for counting the symbol positions within a symbol, including means for initializing said symbol counter after reaching the count of the last symbol position of the symbol;

n even sample and hold cells responsive to read signals from an apparatus reading data from a medium having data recorded thereon in a fixed-block format comprising symbols having a predetermined number of symbol positions in which holes may be written and a predetermined number, 2 (n−1), of holes, n−1 written in even positions and n−1 written in odd positions;

n odd sample and hold cells responsive to said read signals from an said apparatus reading data from said medium having data recorded thereon in a fixed-block format;

means responsive to said symbol counter means for triggering a first of said n even sample and hold cells at the first even symbol position of a symbol;

means responsive to said symbol counter means for triggering successive others of said n even sample and hold cells at successive even symbol positions of a symbol, the number of successive cells triggered corresponding to the number, n−1, of holes which may be written in even positions; n(n−1)/2 even comparator means for comparing each even sample and hold cell value with each of the other even sample and hold cell values;

means responsive to said symbol counter means and to said n(n−1)/2 even comparator means for retaining the values in the even sample and hold cells having the higher values and for triggering the even sample and hold cell having the lowest value at the next even symbol position and for repeating said retention and said triggering of the even sample and hold cell having the lowest value at the occurence of every even symbol position for which the fixed-block code may contain a hole;

means respective to said symbol counter means for triggering a first of said n odd sample and hold cells at the first odd symbol position of a symbol;

means responsive to said symbol counter means for triggering successive others of said n odd sample and hold cells at successive odd symbol positions of a symbol, the number of cells triggered corresponding to the number, n−1, of holes which may be written in odd positions;

n(n−1)/2 odd comparator means for comparing the each odd sample and hold cell value with each of the other odd sample and hold cell values; and means responsive to said symbol counter means and to said n(n−1)/2 odd comparator means for retaining the vlues in the odd sample and hold cells having the higher values and for triggering the odd sample and hold cell having the lowest value at the next odd symbol position and for repeating said retention and said triggering of the odd sample and hold cell having the lowest value at the occurrence of every odd symbol position for which the fixed-block code may contain a hole.

17. The decoding apparatus of claim 16 further including $n(n-1)/2$ even binary register means, one for each of said $n(n-1)/2$ even comparator means and responsive to said one of said $n(n-1)/2$ even comparator means, for recording the counts of said symbol counter divided by two, ignoring fractions, when said one of said $n(n-1)/2$ even comparator means indicates the detection of a new higher valued in one of the sample and holds to which it is connected;

$n(n-1)/2$ odd binary register means, one for each of said $n(n-1)/2$ odd comparator means and responsive to said one of said $n(n-1)/2$ odd comparator means, for recording the counts of said symbol counter divided by two, ignoring fractions, when said one of said $n(n-1)/2$ odd comparator means indicates the detection of a new higher valued in one of the sample and holds to which it is connected;

even decoder means, responsive to said $n(n-1)/2$ even comparator means and to said even binary register means, for determining which of the binary register means contains the addresses of the holes and for decoding these addresses into binary at the end of a symbol.

odd decoder means, responsive to said $n(n-1)/2$ odd comparator means and to said odd binary register means, for determining which of the binary register means contains the addresses of the holes and for decoding these addresses into binary at the end of a symbol.

18. The decoding apparatus of claim 17 wherein said even and said odd binary register means includes address means for latching the binary count of said symbol counter excluding the lowest order bit of the count in response the lowest order bit of the count.

19. The decoding apparatus of claim 16 wherein each of said means responsive to said symbol counter for triggering an odd or an even sample and hold cell at any position of a symbol includes timing means for triggering said odd or even sample and hold cell during the first half of the symbol position and terminating the triggering shortly after the first half of the symbol position.

20. The decoding apparatus of claim 16 further including means for inverting said read signals to an inverted read signals and said higher-valued signals comprise the lower-valued inverted signals and said lowest-valued signals comprise the highest-valued inverted signals.

21. Apparatus for differential decoding of fixed-block encoded data comprising signals read from an apparatus having data recorded thereon in a fixed-block code wherein the code comprises a symbol having an even number, n, of holes, $n/2$ in even positions and $n/2$ in odd positions, comprising timing means for counting the symbol positions within a symbol and providing even symbol position signals, odd symbol position signal and even and odd address signals;

$n/2+1$ even sample and hold cells, a first of which is responsive to read signals from an apparatus reading data from a medium having data recorded thereon in said fixed-block format, the other even sample and hold cells responsive to signals from said first even sample and hold cell;

means responsive to said timing means and said even symbol position signals for triggering said first of said even sample and hold cells at each even symbol position of a symbol;

FP even means responsive to said timing means for triggering succeeding of said other even sample and hold cells at succeeding odd symbol positions until each of the other even sample and hold cells has been triggered;

comparator means responsive to said timing means and said odd symbol position signals for determining which of the other even sample and hold cells contains the lowest-valued signal after each of said other even sample and hold cells has been triggered once, for determining whether the signal in this lowest-valued cell is less than the signal in the first even sample and hold cell, and for triggering said lowest-valued other even sample and hold cell if the detemination is that it is lower;

$n/2$ even register means responsive to said timing means, to said even address signals and to one of said other even sample and hold cells for loading the even address each time said one of said other even sample and holds is triggered;

$n/2+1$ odd sample and hold cells, the first of which is responsive to said read signals from said apparatus reading data from said medium having data recorded thereon in said fixed-block format, the other odd sample and hold cells responsive to the said first odd sample and hold cell;

means responsive to said timing means for triggering said first odd sample and hold cells at each odd symbol position of a symbol;

FP odd means responsive to said timing means for triggering succeeding of said other odd sample and hold cells at succeeding even symbol positions until each of the other odd sample and hold cells has been triggered;

comparator means responsive to said timing means and said even symbol position signals for determining which of the other odd sample and hold cells contains the lowest-valued signal after each of said other odd sample and hold cells has been triggered once, for determining whether the signal in this lowest-valued cell is less than the signal in the first odd sample and hold cell, and for triggering said lowest-valued odd sample and hold cell if the detemination is that it is lower; and $n/2$ odd register means responsive to said timing means, to said odd address signals and to one of said other odd sample and holds for loading the odd address each time said one of said other odd sample and holds is triggered.

22. The decoding apparatus of claim 21 further including:

$n/2$ even decoder means responsive to corresponding of said even registers means for converting the address therein contained to one of $n/2$ symbol position locations;

$n/2$ odd decoder means responsive to corresponding of said odd registers means for converting the address therein contain to one of n/2 symbol positions;

even field programmable logic array means responsive to said n even decoder mean for decoding the n/2 locations into a first set of binary bits; and odd field programmable logic array means responsive to said n odd decoder means for decoding the n/2 locations into said first set of binary bits.

23. The decoding apparatus of claim 21 further including:

means in each of said field programmable logic arrays for outputting the F signal indicative of the decoding of a predetermined locations pattern; and means in each of said field programmable logic arrays responsive to the F signal output of the other for decoding its locations input into a second set of binary bits.

* * * * *

UNITED STATES PATENT AND TRADEMARK OFFICE
CERTIFICATE OF CORRECTION

PATENT NO. : 4,646,281

DATED : February 24, 1987

INVENTOR(S) : Verboom

It is certified that error appears in the above—identified patent and that said Letters Patent is hereby corrected as shown below:

At Column 15, Claim 11, line 51, delete "11" and substitute therefore --12--.

At Column 15, Claim 11, line 51, delete "6" and substitute therefore --11--.

At Column 15, Claim 12, line 57, delete "12" and substitute therefore --11--.

Signed and Sealed this

Twentieth Day of October, 1987

Attest:

DONALD J. QUIGG

Attesting Officer

Commissioner of Patents and Trademarks